United States Patent
Fan (10) Patent No.: US 12,442,388 B2
(45) Date of Patent: Oct. 14, 2025

(54) FAN WITH MULTILAYER FAN BLADES

(71) Applicant: Huizhou Xunshuo Technology Co., Ltd, Guangdong (CN)

(72) Inventor: Ganglong Fan, Guangdong (CN)

(73) Assignee: Huizhou Xunshuo Technology Co., Ltd, Huizhou (CN)

( * ) Notice: Subject to any disclaimer, the term of this patent is extended or adjusted under 35 U.S.C. 154(b) by 0 days.

(21) Appl. No.: 18/651,545

(22) Filed: Apr. 30, 2024

(65) Prior Publication Data

US 2025/0270999 A1      Aug. 28, 2025

(30) Foreign Application Priority Data

Feb. 27, 2024   (CN) .......................... 202420372650.8

(51) Int. Cl.
*F04D 29/38*      (2006.01)
*F04D 19/00*      (2006.01)

(52) U.S. Cl.
CPC .......... *F04D 29/388* (2013.01); *F04D 19/002* (2013.01); *F04D 29/384* (2013.01)

(58) Field of Classification Search
CPC .... F04D 29/388; F04D 29/324; F04D 29/384; F04D 29/38; F04D 19/002; F04D 19/00
See application file for complete search history.

(56) References Cited

U.S. PATENT DOCUMENTS

| | | | | |
|---|---|---|---|---|
| 3,178,099 A | * | 4/1965 | Child | F04D 29/384 |
| | | | | 415/121.2 |
| 5,089,733 A | * | 2/1992 | Fukuoka | H02P 6/16 |
| | | | | 310/156.43 |
| 5,947,704 A | * | 9/1999 | Hsieh | F04D 25/062 |
| | | | | 417/423.12 |
| 10,790,726 B2 | * | 9/2020 | Diemunsch | H02K 9/06 |

\* cited by examiner

*Primary Examiner* — Michael L Sehn (57) ABSTRACT

Disclosed is a fan with multilayer fan blades, including a fan frame and a motor. Multilayer fan blades are arranged in the fan frame; the multilayer fan blades are connected to the motor, and the multilayer fan blades are arranged with at least two fan blade connection rings. According to the above solution, by utilizing the design of blade shapes and the number of different curved surfaces of the multilayer fan blades, an inner layer has a faster wind speed than an outer layer, and the fan is changed from a smooth wind suction flow field to a spiral flow field with a funneling effect, reducing the attenuation of long-distance wind flow and improving the heat dissipation efficiency at a far working point.

9 Claims, 7 Drawing Sheets

FAN WITH MULTILAYER FAN BLADES

CROSS-REFERENCE TO RELATED APPLICATIONS

This application claims priority of Chinese Patent Application No. 202420372650. 8, filed on Feb. 27, 2024, the entire contents of which are incorporated herein by reference.

TECHNICAL FIELD

The present disclosure relates to the field of radiators, and in particular to a fan with multilayer fan blades.

BACKGROUND

A fan is an important part of a radiator, which can realize the cooling function by accelerating the air flow speed to take away the heat.

In the prior art, an ordinary fan cannot take into account an wind volume and a static pressure. A fan with a large wind volume at a fixed rotation speed usually has a low wind pressure; the actual heat dissipation effect of the ordinary fan at a working point is not good enough; and the ordinary fan cannot realize the function of providing different wind volumes and wind pressures at different positions, with a non-ideal use effect. Therefore, a fan having a better actual heat dissipation effect at a working point and a function of providing different wind volumes and wind pressures at different positions is required.

SUMMARY

An object of the present disclosure is to provide a fan with multilayer fan blades to overcome the deficiencies in the prior art. The object of the present disclosure is realized by the following technical solutions.

A fan with multilayer fan blades includes a fan frame and a motor. The fan frame accommodates and protects fan blades, the motor converts electric energy into electromagnetic energy and then converts the same into kinetic energy for rotation, and the rotation of the fan blades drives the airflow to achieve the heat dissipation function. Multilayer fan blades are arranged in the fan frame, and blade shapes and the number of blades in different layers of the multilayer fan blades are different. By adjusting the blade shapes, the number and angles of the blades in different layers, the fan can blow different winds in different layers, a volume and a pressure of wind driven by the blades in different layers are different, and different layers can have different advantages according to requirements. For example, a first layer has a fast wind speed, and a second layer has a large wind volume; in addition, it is possible to utilize the difference of blades in different layers to blow wind of a special shape. For example, by increasing a wind speed of the first layer close to a center and reducing a wind speed of the second layer, the airflow moves closer to the center when a wind speed of the center is fast and a wind speed of the periphery is slow, so that the fan is changed from a smooth wind suction flow field to a spiral flow field with a funneling effect, forming a wind type of tornado. After blowing a certain distance, the wind volume and wind pressure will suddenly increase slightly during continue decreases. By utilizing this feature, the actual heat dissipation effect of the fan at a working point can be greatly improved. The multilayer fan blades are connected to the motor, and a connection block is arranged in a center of the multilayer fan blades. The connection block is connected to the motor to play a fixed role. The multilayer fan blades are arranged with at least two fan blade connection rings, an outer side of the fan blade connection ring is arranged with blades forming a circle, and shapes and the number of blades on outer sides of the fan blade connection rings in different layers are different. A plurality of blades are arranged between the connection block and the fan blade connection ring, a plurality of blades are arranged between the fan blade connection ring and another fan blade connection ring, the fan blade connection rings having multiple layers, and fan blade connection rings in different layers have the same circle center and different radii.

In one example, a plurality of first layer blades are arranged on an outer side of the connection block, the connection block being in a circular shape, and the plurality of first layer blades form a circle around the connection block. A first layer fan blade connection ring is arranged on outer sides of the first layer blades, the first layer fan blade connection ring being a circular ring, and the first layer blades are connected to an inner side of the first layer fan blade connection ring. A plurality of second layer blades are arranged on an outer side of the first layer fan blade connection ring, a second layer fan blade connection ring is arranged on outer sides of the second layer blades, the second layer fan blade connection ring being a circular ring, and the second layer blades are connected to an inner side of the second layer fan blade connection ring, the second layer fan blade connection ring, which is the outermost layer and has no blades on an outer side, being a mute ring. By arranging the mute ring on the outermost layer, the strength of the fan is increased, the vibration of the fan when rotating is reduced, and the impact noise between a fan blade flow field and an outer frame is reduced.

In one example, the number, angles, and curved surface shapes of the first layer blades are inconsistent with those of the second layer blades, specifically, the first layer blades have seven blades, and the second layer blades have nine blades; an included angle between the first layer blade and a horizontal plane is less than that between the second layer blade and the horizontal plane; and a curved surface of the first layer blade is less than that of the second layer blade.

In one example, the included angle between the first layer blade and the horizontal plane is less than that between the second layer blade and the horizontal plane, and a smaller included angle increases a horizontal area of the blades. A wind speed of the first layer blades is greater than that of the second layer blades at the same rotation speed, so that the fan is changed from the smooth wind suction flow field to the spiral flow field with a funneling effect, which not only enables system heating parts close to an air outlet surface of the fan to obtain a good heat dissipation effect, but also enables far parts to obtain a good heat dissipation effect as well because a spiral effect reduces the attenuation of long-distance wind flow.

In one example, the fan blade connection ring is a circular ring, and an inner side of the fan blade connection ring is connected to and fixed on the blades; the at least two fan blade connection rings have a consistent circle center and different radii; and the fan blade connection rings in different layers have a consistent circle center and different radii.

In one example, the multilayer fan blades are in a cylindrical shape, a plurality of blades forming a circle are arranged between the connection block and the fan blade connection ring, and the connection block is connected to and fixed on the fan blade connection ring via the blades forming a circle; and a plurality of blades forming a circle are arranged between the fan blade connection ring and another fan blade connection ring, and the fan blade connection ring is connected to and fixed on another fan blade connection ring via the blades forming a circle.

In one example, the multilayer fan blades are connected to the motor via a bearing, the multilayer fan blades are driven to rotate by the rotation of the motor, and the rotation of the multilayer fan blades drives the airflow to flow to dissipate heat for a case.

In one example, the fan frame is arranged with a motor fixing position, and the motor fixing position is located in the center of the fan frame; a magnetic attraction fixing position is arranged at a bottom of the motor fixing position, and the magnetic attraction fixing position is a cylindrical hollow of the motor fixing position; a magnet housing is arranged in the magnetic attraction fixing position, and a shape of the magnet housing is matched with the magnetic attraction fixing position and is slightly smaller than the magnetic attraction fixing position; and a magnet is arranged in the magnet housing, and the magnet attracts a fan blade rotating shaft to assist in mounting.

In one example, a raised fan blade rotating shaft is arranged in the center of the multilayer fan blades, and the magnetic attraction fixing position is matched with the fan blade rotating shaft in position; and the fan blade rotating shaft is inserted into and mutually attracts the magnet in the magnetic attraction fixing position, assisting the fan blades to be mounted on the fan frame.

In one example, a rubber magnet is arranged on an outer side of the motor, a motor housing is arranged on an outer side of the rubber magnet, and a printed circuit board (PCB) control panel is arranged below the motor. The motor housing protects the motor, and the PCB control panel controls the rotation of the motor.

The present disclosure has the following advantageous effect.

According to the above technical solutions adopted by the present disclosure, by utilizing the design of blade shapes and the number of different curved surfaces of the multilayer fan blades, an inner layer has a faster wind speed than an outer layer, and the fan is changed from the smooth wind suction flow field to the spiral flow field with a funneling effect, which not only enables the system heating parts close to the air outlet surface of the fan to obtain a good heat dissipation effect, but also enables the far parts to obtain a good heat dissipation effect as well because the spiral effect reduces the attenuation of long-distance wind flow. In addition, the fan not only has a good actual heat dissipation effect at the working point, but also can provide different wind volumes and wind pressures for different positions to blow the targeted wind. The multilayer fan blades have high structure strength and small operating noise. There are advantages in product power.

BRIEF DESCRIPTION OF THE DRAWINGS

In order to explain the technical solutions in examples of the present disclosure more clearly, brief descriptions are given below of the accompanying drawings which are required to be used in the present disclosure. It is to be understood that the following accompanying drawings illustrate only some examples of the present disclosure, and therefore, the examples are not considered as limiting the scope. Other related accompanying drawings can be obtained according to the drawings without creative efforts for those of ordinary skill in the art.

Reference numerals and denotations thereof: 1—fan frame, 2—motor, 3—multilayer fan blade, 4—connection block, 5—fan blade connection ring, 6—mute ring, 7—first layer blade, 8—second layer blade, 9—bearing, 10—motor fixing position, 11—magnetic attraction fixing position, 12—magnet, 13—magnet housing, 14—fan blade rotating shaft, 15—rubber magnet, 16—motor housing, and 17—PCB control panel.

DETAILED DESCRIPTION

To facilitate the understanding of the present disclosure, the present disclosure is described more comprehensively with reference to related accompanying drawings. Preferred examples of the present disclosure are shown in the accompanying drawings. However, the present disclosure can be implemented in many different forms and is not limited to implementations described herein. On the contrary, these examples are provided for a more thorough and comprehensive understanding of the disclosure of the present disclosure.

It is to be noted that when an element is said to be "fixed" to another element, it can be directly fixed to another element or fixed to an element therebetween. When an element is considered to be "connected" to another element, it can be directly connected to another element or connected to an element therebetween. The terms "vertical", "horizontal", "left", "right" and similar expressions used herein are for illustrative only, and do not represent the only implementation.

Unless otherwise defined, all technical and scientific terms used herein have the same meaning as commonly understood by those skilled in the technical field of the present disclosure. The terms used herein in the specification of the present disclosure are only for describing specific implementations, and are not intended to limit the present disclosure. The term "and/or" used herein includes any and all combinations of one or more of related listed items.

The present disclosure is referred to FIGS. 1-9.

A fan with multilayer fan blades includes a fan frame 1 and a motor 2. Multilayer fan blades 3 are arranged in the fan frame 1; the multilayer fan blades 3 are connected to the motor 2, a connection block 4 is arranged in a center of the multilayer fan blades 3, and the multilayer fan blades 3 are arranged with at least two fan blade connection rings 5; and a plurality of blades are arranged between the connection block 4 and the fan blade connection ring 5, and a plurality of blades are arranged between the fan blade connection ring 5 and another fan blade connection ring 5.

By adopting the above technical solution, the fan frame 1 accommodates and protects the fan blades, the motor 2 converts electric energy into electromagnetic energy and then converts the same into kinetic energy for rotation, and the rotation of the fan blades drives the airflow to achieve the heat dissipation function. Blade shapes and the number of blades in different layers of the multilayer fan blades 3 in the fan frame 1 are different. By adjusting the blade shapes, the number and angles of the blades in different layers, the fan can blow different winds in different layers, and a volume and a pressure of wind driven by the blades in different layers are different. By increasing a wind speed of a first layer close to the center and reducing a wind speed of a second layer, the fan is changed from a smooth wind suction flow field to a spiral flow field with a funneling effect, forming a wind type of tornado. By a spiral effect, the attenuation of long-distance wind flow is reduced, and the actual heat dissipation effect of the fan at a working point is improved. The motor 2 is connected to and fixed on the connection block 4 in the center of the multilayer fan blades 3, and the multilayer fan blades 3 are arranged with at least the two fan blade connection rings 5, the fan blade connection rings 5 having multiple layers. The fan blade connection rings 5 in different layers have the same circle center and different radii; and blade shapes and the number of outer sides of the fan blade connection rings 5 in different layers are different. A plurality of blades forming a circle are arranged between the connection block 4 and the fan blade connection ring 5, and a plurality of blades forming a circle are arranged between the fan blade connection ring 5 and another fan blade connection ring 5.

Preferably, a plurality of first layer blades 7 are arranged on an outer side of the connection block 4, a first layer fan blade connection ring is arranged on outer sides of the first layer blades 7, a plurality of second layer blades 8 are arranged on an outer side of the first layer fan blade connection ring, and a second layer fan blade connection ring is arranged on outer sides of the second layer blades 8, the second layer fan blade connection ring being a mute ring 6.

By adopting the above technical solution, a plurality of first layer blades 7 forming a circle are arranged on the outer side of the connection block 4, an inner side of a first layer fan blade connection ring in a circular ring shape is connected to outer sides of the first layer blades 7, a plurality of second layer blades 8 forming a circle are arranged on an outer side of the first layer fan blade connection ring, and an inner side of a second layer fan blade connection ring in a circular ring shape is connected to outer sides of the second layer blades 8, the second layer fan blade connection ring, which is the outermost layer and has no blades on an outer side, being a mute ring 6. By arranging the mute ring 6, the strength of the fan is increased, the vibration of the fan when rotating is reduced, and the impact noise between a fan blade flow field and an outer frame is reduced.

Preferably, the number, angles, and curved surface shapes of the first layer blades 7 are inconsistent with those of the second layer blades 8.

By adopting the above technical solution, since the number, angles, and curved surface shapes of the first layer blades 7 are inconsistent with those of the second layer blades 8, a wind speed blown by the first layer blades 7 is faster than that blown by the second layer blades 8, so that the fan is changed from the smooth wind suction flow field to the spiral flow field with a funneling effect, improving the heat dissipation efficiency of the working point.

Figure 6:
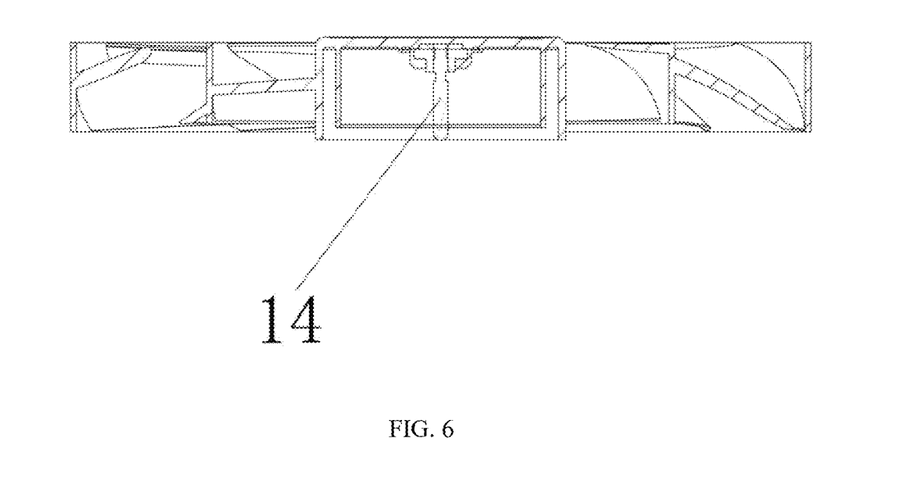
FIG. 6 is a sectional view taken along BB in FIG. 5.

Preferably, an included angle between the first layer blade 7 and a horizontal plane is less than that between the second layer blade 8 and the horizontal plane.

By adopting the above technical solution, a horizontal area of the first layer blades 7 is increased, and a wind speed of the first layer blades 7 is greater than that of the second layer blades 8 at the same rotation speed, so that the fan is changed from the smooth wind suction flow field to the spiral flow field with a funneling effect, which not only enables system heating parts close to an air outlet surface of the fan to obtain a good heat dissipation effect, but also enables far parts to obtain a good heat dissipation effect as well because the spiral effect reduces the attenuation of long-distance wind flow.

Figure 5:
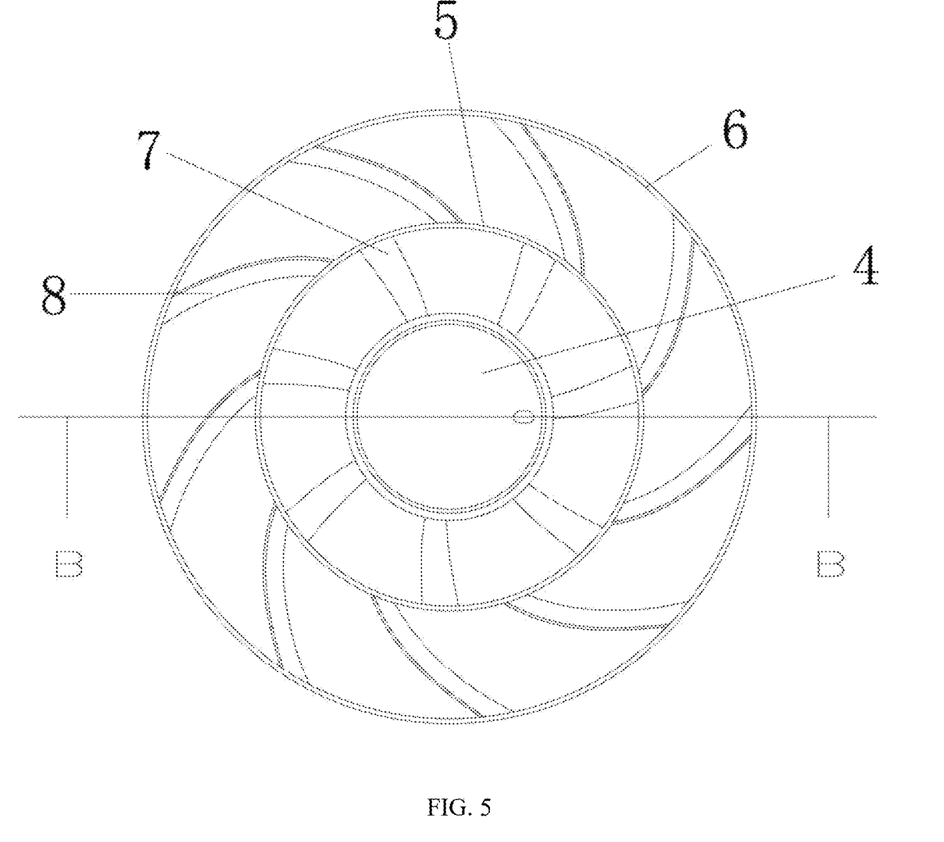
FIG. 5 is a front view of multilayer fan blades.
Figure 7:
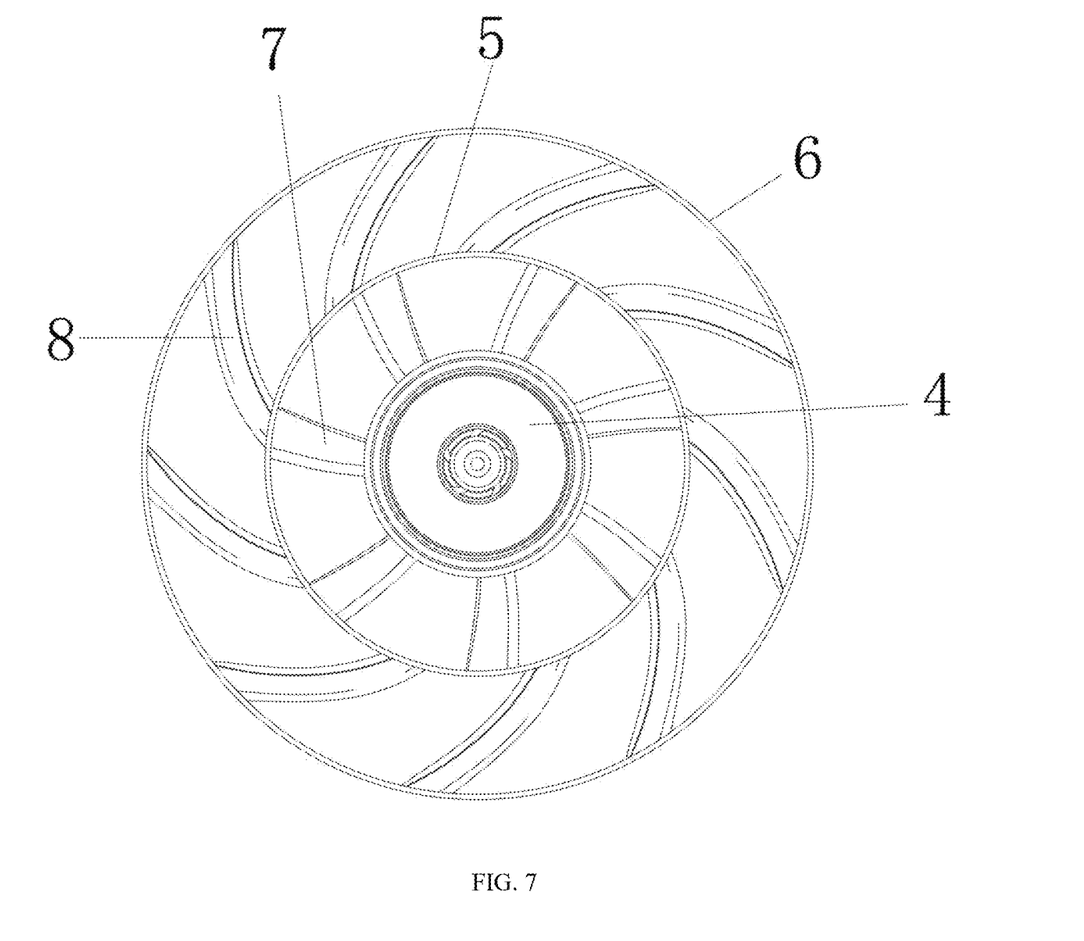
FIG. 7 is a rear view of the multilayer fan blades.

Preferably, the fan blade connection ring 5 is a circular ring, and the at least two fan blade connection rings 5 have a consistent circle center and different radii.

By adopting the above technical solution, different layers of the multilayer fan blades 3 can be arranged with different fan blades, and different wind shapes and wind speeds can be blown from different layers at a fixed speed.

Figure 8:
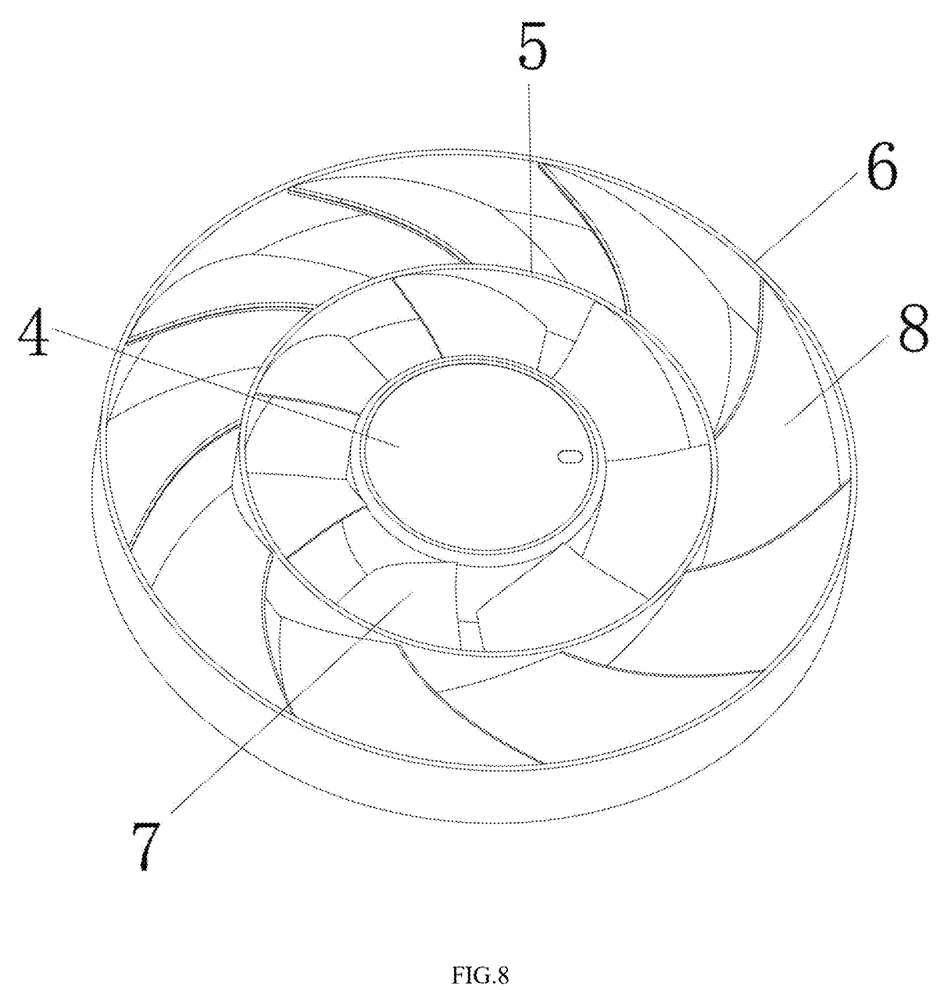
FIG. 8 is a perspective view I of the multilayer fan blades.
Figure 9:
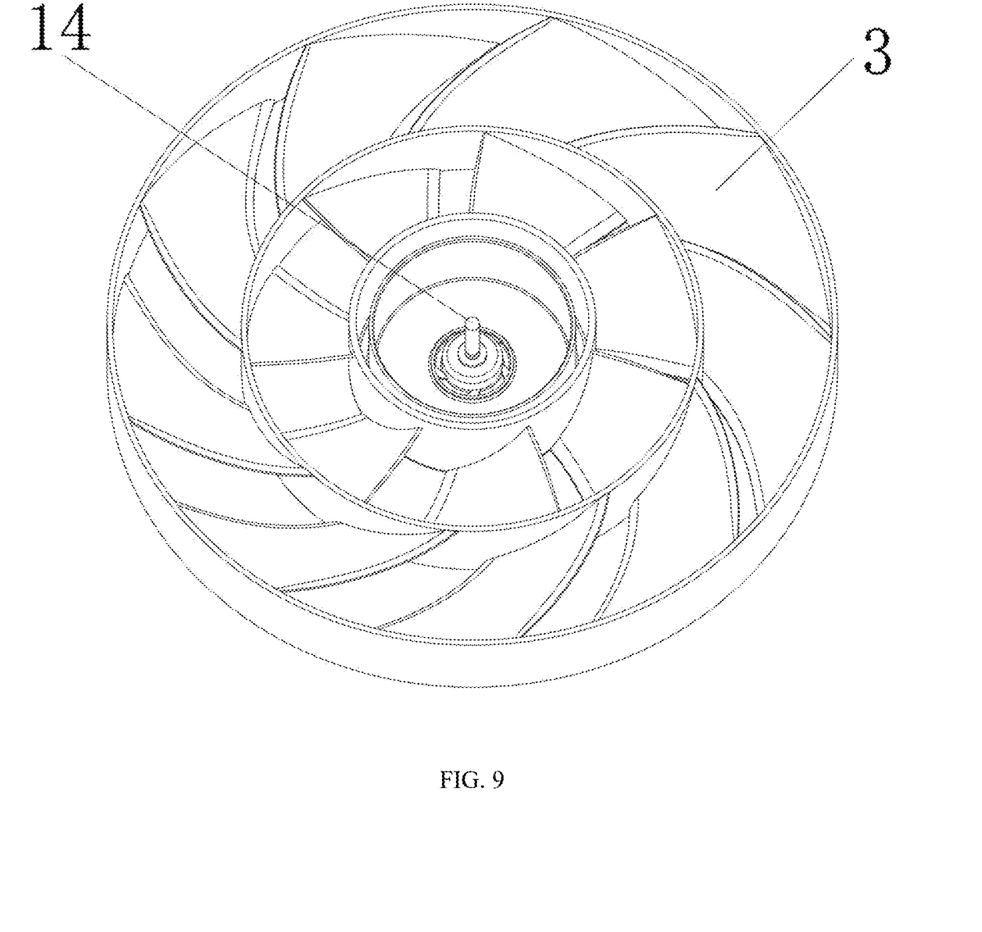
FIG. 9 is a perspective view II of the multilayer fan blades.

Preferably, the multilayer fan blades 3 are in a cylindrical shape, a plurality of blades forming a circle are arranged between the connection block 4 and the fan blade connection ring 5, and a plurality of blades forming a circle are arranged between the fan blade connection ring 5 and another fan blade connection ring 5.

By adopting the above technical solution, the plurality of blades forming a circle between the connection block 4 and the fan blade connection ring 5 and the plurality of blades forming a circle between the fan blade connection ring 5 and another fan blade connection ring 5 drive air to flow when the fan blades rotate, and different wind shapes can be blown.

Figure 1:
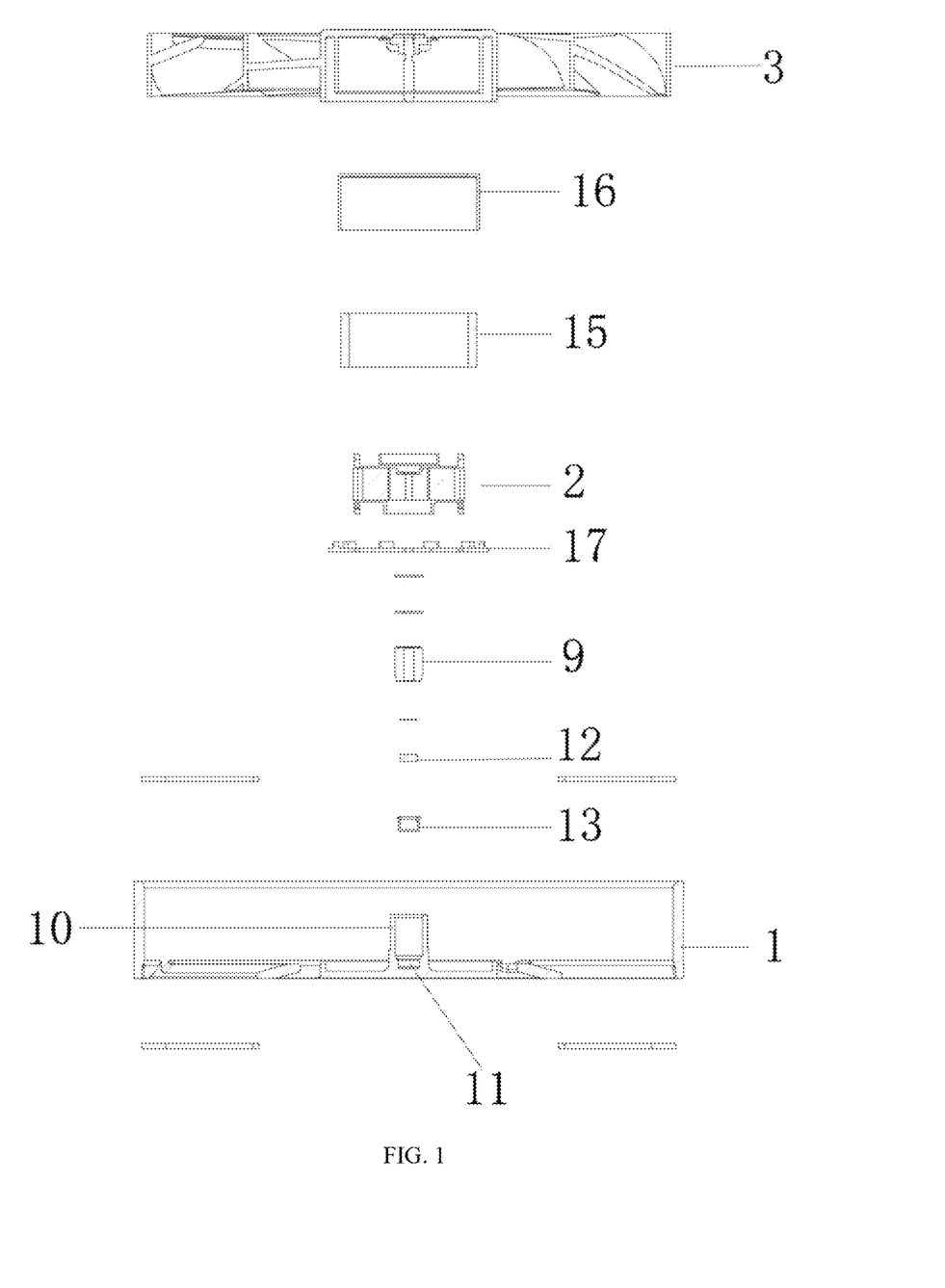
FIG. 1 is an exploded view of the present disclosure.
Figure 2:
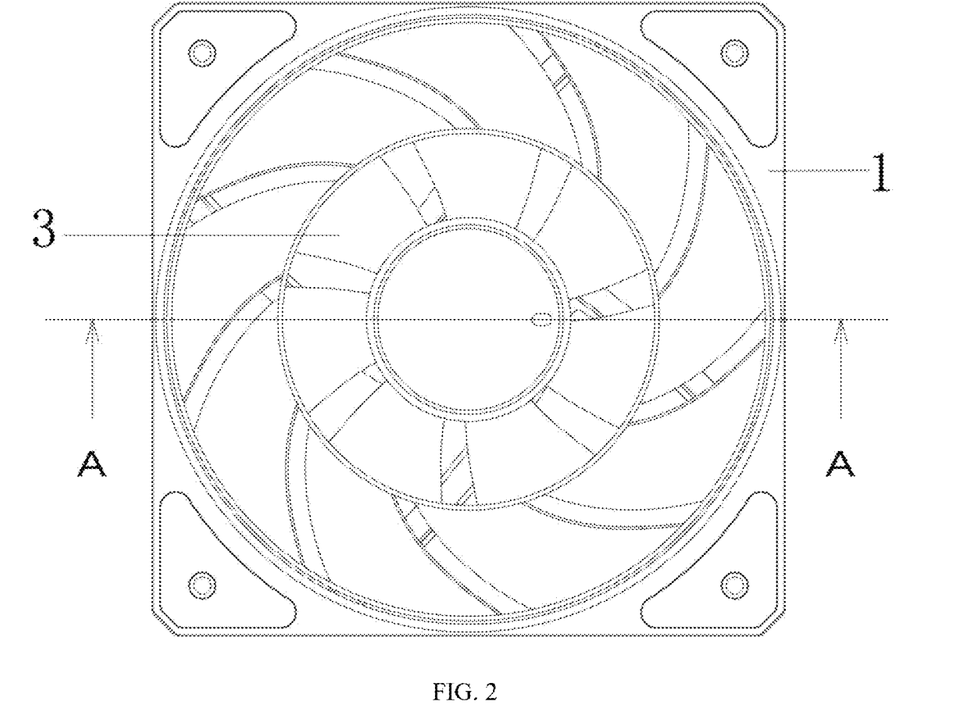
FIG. 2 is a front view of the present disclosure.
Figure 3:
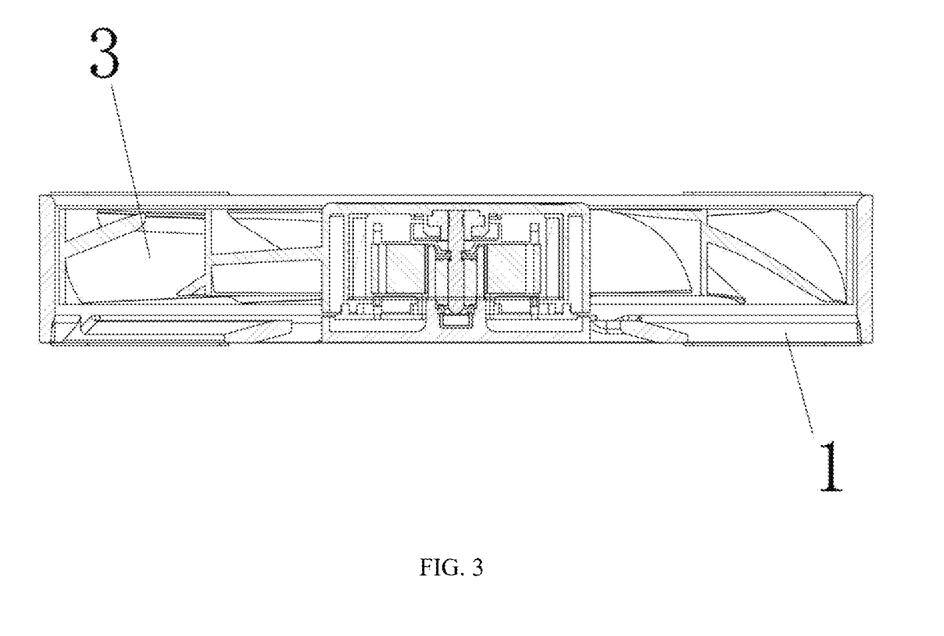
FIG. 3 is a sectional view taken along AA in FIG. 2.
Figure 4:
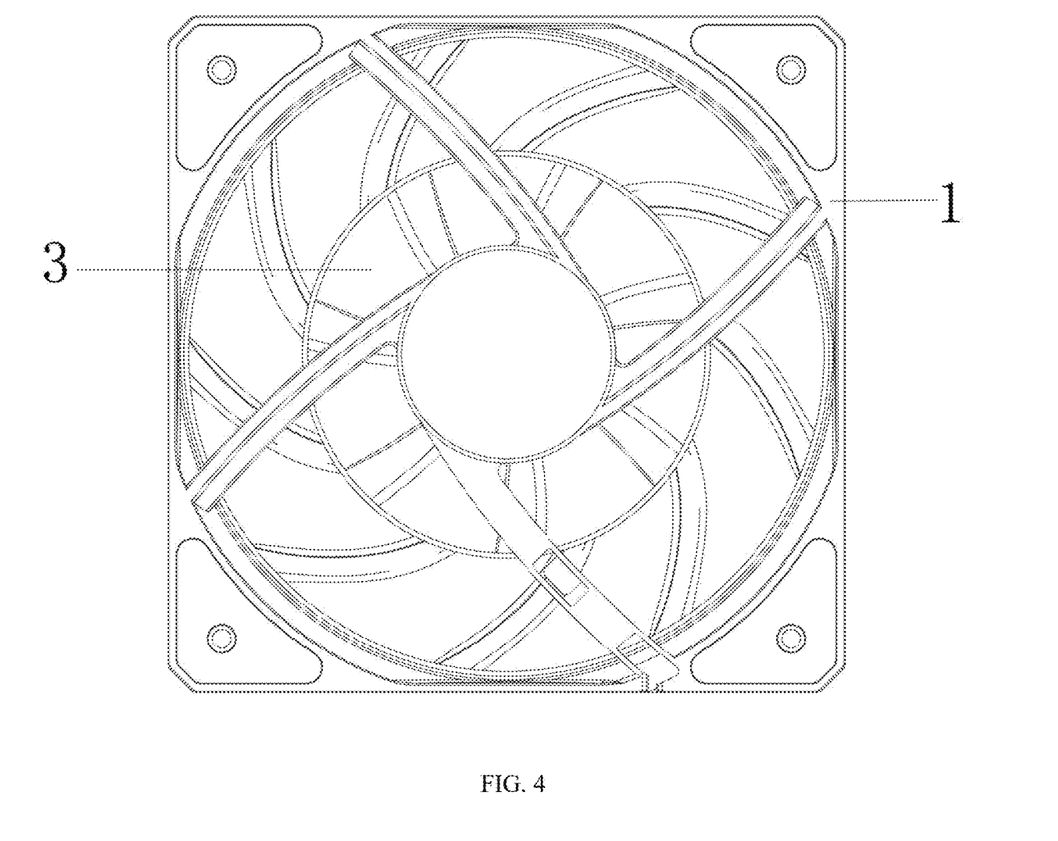
FIG. 4 is a rear view of the present disclosure.

Preferably, the multilayer fan blades 3 are connected to the motor 2 via a bearing 9.

By adopting the above technical solution, the multilayer fan blades 3 are driven to rotate by the rotation of the motor 2, and the rotation of the multilayer fan blades 3 drives the airflow to flow to dissipate heat for a case.

Preferably, the fan frame 1 is arranged with a motor fixing position 10, a magnetic attraction fixing position 11 is arranged at a bottom of the motor fixing position 10, a magnet housing 13 is arranged in the magnetic attraction fixing position 11, and a magnet 12 is arranged in the magnet housing 13.

By adopting the above technical solution, the motor fixing position 10 fixes the motor 2 on the fan frame 1, the magnetic attraction fixing position 11 accommodates the magnet 12 and the magnet housing 13, the magnet housing 13 protects the magnet 12, and the magnet 12 assists in mounting the fan blades by magnetic attraction.

Preferably, a raised fan blade rotating shaft 14 is arranged in the center of the multilayer fan blades 3, and the magnetic attraction fixing position 11 is matched with the fan blade rotating shaft 14 in position.

By adopting the above technical solution, the fan blade rotating shaft 14 corresponding to a position of the magnetic attraction fixing position 11 can attract the magnet 12 when the fan blades are mounted, facilitating the mounting.

Preferably, a rubber magnet 15 is arranged on an outer side of the motor 2, a motor housing 16 is arranged on an outer side of the rubber magnet 15, and a PCB control panel 17 is arranged below the motor 2.

By adopting the above technical solution, the motor housing 16 protects the motor 2, and the PCB control panel 17 controls the rotation of the motor 2.

The working principle is as follows. By utilizing the design of different blade shapes in different layers of the multilayer fan blades 3, in combination with blowing wind with special shapes, the heat dissipation requirements of users at different working points can be realized. For example, the blade shape can be changed to speed up a wind speed in the first layer, so that the fan is changed from the smooth wind suction flow field to the spiral flow field with a funneling effect, reducing the attenuation of long-distance wind flow and improving the heat dissipation efficiency at the far working point.

When in use, a worker assembles the multilayer fan blades 3 with a specific shape to the fan frame 1 to complete the fan assembly, and the user mounts the fan at a desired place to complete the mounting by electrifying.

The above examples only express several implementations of the present disclosure, and are described more specifically and in detail, but which cannot be understood as limiting the scope of disclosure patents. It is to be pointed out that for those skilled in the art, without departing from the concept of the present disclosure, several modifications and improvements can be made, which are within the protection scope of the present disclosure. Therefore, the scope of protection of the present disclosure is subject to the appended claims.

The invention claimed is:

1. A fan with multilayer fan blades, comprising:
a fan frame; and
a motor;
wherein multilayer fan blades are arranged in the fan frame; the multilayer fan blades are connected to the motor, a connection block is arranged in a center of the multilayer fan blades, and the multilayer fan blades are arranged with at least two layers of fan blade connection rings; and a plurality of first layer blades are arranged between the connection block and a first layer fan blade connection ring, and a plurality of second layer blades are arranged between the first layer fan blade connection ring and a second layer fan blade connection ring;
wherein the multilayer fan blades comprises the plurality of first layer blades and the plurality of second layer blades, and the at least two layers of fan blade connection rings comprises the first layer fan blade connection ring and the second layer fan blade connection ring;
wherein the fan frame is arranged with a motor fixing position, a magnetic attraction fixing position is arranged at a bottom of the motor fixing position, a magnet housing is arranged in the magnetic attraction fixing position, and a magnet is arranged in the magnet housing.

2. The fan with multilayer fan blades according to claim 1, wherein the plurality of first layer blades are arranged on an outer side of the connection block, the first layer fan blade connection ring is arranged on outer sides of the plurality of first layer blades, the plurality of second layer blades are arranged on an outer side of the first layer fan blade connection ring, the second layer fan blade connection ring is arranged on outer sides of the plurality of second layer blades, and the second layer fan blade connection ring is a mute ring.

3. The fan with multilayer fan blades according to claim 2, wherein the number, angles, and curved surface shapes of the plurality of first layer blades are inconsistent with those of the plurality of second layer blades.

4. The fan with multilayer fan blades according to claim 2, wherein an included angle between the plurality of first layer blades and a horizontal plane is less than that between the plurality of second layer blades and the horizontal plane.

5. The fan with multilayer fan blades according to claim 1, wherein the at least two layers of fan blade connection rings are a circular rings, and each of the at least two layers of fan blade connection rings has a consistent circle center and different radii.

6. The fan with multilayer fan blades according to claim 1, wherein the multilayer fan blades are in a cylindrical shape, the plurality of first layer blades are arranged between the connection block and the first layer fan blade connection ring to form a circle, and the plurality of second layer blades are arranged between the first layer fan blade connection ring and the second layer fan blade connection ring to form a circle.

7. The fan with multilayer fan blades according to claim 1, wherein the multilayer fan blades are connected to the motor via a bearing.

8. The fan with multilayer fan blades according to claim 1, wherein a raised fan blade rotating shaft is arranged in the center of the multilayer fan blades, and the magnetic attraction fixing position is matched with the fan blade rotating shaft in position.

9. The fan with multilayer fan blades according to claim 1, wherein a rubber magnet is arranged on an outer side of the motor, a motor housing is arranged on an outer side of the rubber magnet, and a printed circuit board (PCB) control panel is arranged below the motor.

* * * * *